US012400767B2

(12) United States Patent
Segond

(10) Patent No.: US 12,400,767 B2
(45) Date of Patent: Aug. 26, 2025

(54) METHOD FOR OPERATING A NUCLEAR REACTOR USING CALCULATION OF THE DEPARTURE FROM NUCLEATE BOILING RATIO

(71) Applicant: FRAMATOME, Courbevoie (FR)

(72) Inventor: Mathieu Segond, Paris (FR)

(73) Assignee: FRAMATOME, Courbevoie (FR)

(*) Notice: Subject to any disclaimer, the term of this patent is extended or adjusted under 35 U.S.C. 154(b) by 1104 days.

(21) Appl. No.: 17/275,969

(22) PCT Filed: Sep. 12, 2019

(86) PCT No.: PCT/EP2019/074373
§ 371 (c)(1),
(2) Date: Dec. 23, 2021

(87) PCT Pub. No.: WO2020/053339
PCT Pub. Date: Mar. 19, 2020

(65) Prior Publication Data
US 2022/0115155 A1    Apr. 14, 2022

(30) Foreign Application Priority Data
Sep. 12, 2018  (FR) ..................... 1858157

(51) Int. Cl.
G21D 3/00      (2006.01)
G06N 3/045     (2023.01)
(Continued)

(52) U.S. Cl.
CPC ............ *G21D 3/001* (2013.01); *G06N 3/045* (2023.01); *G21C 17/108* (2013.01); *G06N 3/082* (2013.01); *G21C 9/00* (2013.01)

(58) Field of Classification Search
CPC ........ G21D 3/001; G21C 17/108; G21C 9/00; G06N 3/045; G06N 3/082
(Continued)

(56) References Cited

U.S. PATENT DOCUMENTS 4,330,367 A    5/1982  Musick
6,061,412 A    5/2000  Stucker et al.
(Continued)

FOREIGN PATENT DOCUMENTS

CN    101755305 A    6/2010
CN    104933245 A    9/2015
(Continued)

OTHER PUBLICATIONS

Corresponding Search Report for PCT/EP2019/074373.
(Continued)

*Primary Examiner* — Jack W Keith
*Assistant Examiner* — Daniel Wasil
(74) *Attorney, Agent, or Firm* — Davidson Kappel LLC

(57) ABSTRACT

A method for operating a nuclear reactor comprises acquiring a plurality of quantities characterizing the operation of the nuclear reactor; and calculating at least one Departure from Nucleate Boiling Ratio using a deep neural network. The entries of the deep neural network are determined by using the acquired quantities. The deep neural network includes at least two hidden layers of at least five neurons each. The method further includes calculating the deviations between the at least one calculated Departure from Nucleate Boiling Ratio and a plurality of predetermined reference threshold values and formulating a control signal for a reactor control system by using the calculated deviations. The control signal is an automatic reactor shutdown or alarm. The method also includes emergency shutdown of the nuclear reactor or emission of an alarm signal if relevant.

20 Claims, 5 Drawing Sheets

(51) Int. Cl.
*G21C 17/108* (2006.01)
*G06N 3/082* (2023.01)
*G21C 9/00* (2006.01)

(58) Field of Classification Search
USPC .................................................. 376/216, 254
See application file for complete search history.

(56) References Cited

U.S. PATENT DOCUMENTS

| | | |
|---|---|---|
| 2009/0021987 A1 | 1/2009 | Sarin et al. |
| 2010/0119026 A1 | 5/2010 | Gautier et al. |
| 2016/0180976 A1 | 6/2016 | Park et al. |

FOREIGN PATENT DOCUMENTS

| | | |
|---|---|---|
| CN | 105608842 A | 5/2016 |
| CN | 106709133 A | 5/2017 |
| GB | 2544351 A | 5/2017 |
| KR | 20040099884 A | 12/2004 |
| KR | 20170125705 A | 11/2017 |
| RU | 2438198 C1 | 12/2011 |
| RU | 2574289 C2 | 12/2015 |

OTHER PUBLICATIONS

Corresponding Search Report for FR1858157.
Wang Kee In et al.: "Assessment of Core Protection and Monitoring Systems for an Advanced Reactor SMART", Annals of Nuclear Energy, Pergamon Press, vol. 29, No. 5, Mar. 1, 2002, pp. 609-621.
Almasry: "Neural Network Variants of Adaptive Power Control of the VVER Neuclear Reactor", Global Nuclear Center, No. 3(20), pp. 1-10, (2016) (with computer translation).
Kim et al. "Estimation of Minimum DNBR Using Cascaded Fuzzy Neural Network", Transaction of the Koran Nuclear Society Spring Meeting, pp. 1-6, (May 2015).
Nabeshima et al: "Real-Time Neuclear Power Plant Monitoring with Neural Network", Journal of Nuclear Science and Technology, vol. 35, No. 2, Facility Operation Nuclear Industry, pp. 1-8, (Feb. 1998).
Kim et al. "Development of a Black Propagation Network for One-Step transient DNBR Calculations", Korea Atomic Energy Research Institute, pp. 1437-1446, (Apr. 1997).

METHOD FOR OPERATING A NUCLEAR REACTOR USING CALCULATION OF THE DEPARTURE FROM NUCLEATE BOILING RATIO

The present disclosure relates in general to the protection and/or monitoring of the core of a pressurized water nuclear reactor against a boiling crisis.

BACKGROUND

Maintaining the integrity of the first safety barrier (fuel cladding) is a major objective in the design of nuclear reactors, and is the subject of a safety demonstration carried out, among other things, by simulating the behavior of the reactor during families of accidental transients, using numerical calculation codes.

All this analysis is recorded in the final safety report for the facility, which is required by the nuclear safety authority to grant operating authorization for the reactor.

The integrity of the fuel cladding is guaranteed by the absence of fusion in the center of the fuel pellets, and by the absence of a boiling crisis (Departure from Nucleate Boiling, DNB) on the surface of the cladding. These conditions must be met at all points in the core.

The boiling crisis is characterized by a degradation of the thermal exchange between the heat transfer fluid of the primary circuit and the surface of the fuel cladding, which can lead to a calefaction phenomenon and a possible loss of integrity of the first barrier.

Each nuclear reactor is equipped with a protection system, whose role is to guarantee the safety of the reactor for a certain number of accident situations. The protection system typically includes a protection chain known as lowDBNRDeparture from Nuclear Boiling Departure from Nuclear Boiling Ratio DNBR. In reactors with four primary loops such as the 1300 MWe, N4 and EPR, the low DBNRDBNR protection chain ensures the protection of the nuclear reactor against the boiling crisis phenomenon during category 2 accidental transients, characterized by an insertion of reactivity with moderate dynamics (uncontrolled withdrawal of control units, untimely dilution of the primary fluid leading to a decrease in the concentration of boron, untimely cooling of the primary circuit, etc.).

To this end, the protection system includes an information processing unit (called a digital integrated protection and control system or DIPC) on 1300 MWe and N4 reactors), which integrates a functional unit known as the "low DBNR algorithm". This algorithm calculates the safety margins online with respect to the boiling crisis. To do so, it calculates the DBNR, and compares the calculated value to a limit value taking into account the reactor design uncertainties and the uncertainties in reconstruction of the DBNR value. The low DBNR protection chain causes an automatic shutdown of the reactor if the reconstructed value is below the limit.

The Departure from Nuclear Boiling or DBNR is defined as the ratio between the critical heat flux and the local heat flux. The local heat flux corresponds to the heat flux emitted by the fuel rods through the cladding. The critical heat flux is the value of the heat flux leading to damage to the fuel rod cladding, which depends on the local thermo-hydraulic conditions of the fluid.

The low DBNR algorithm uses a simplified thermo-hydraulic model of the core, adjusted at the design stage by corrective functions (bias curves) acting on the local thermo-hydraulic quantities, in order to ensure a conservative response to the DBNR calculated by the 3D thermo-hydraulic reference code.

This simplified thermo-hydraulic modeling enables calculation of the local thermal flux from the measured quantities characterizing the power distribution of the reactor and the local thermo-hydraulic conditions allowing the evaluation of the critical thermal flux.

In addition, the low DBNR algorithm uses a predetermined critical flux correlation to calculate the critical thermal flux. This correlation is determined empirically from experimental data. The design of this correlation shows a complex and costly development. Its multidimensional polynomial-type analytical formula is postulated a priori and manually adjusted in successive steps during the development process in order to meet certain statistical criteria.

The low DBNR calculation algorithm is not very precise, so that it is necessary to allow large margins to guarantee safety during nuclear reactor operations. This is very penalizing for reactor control. In addition, although simplified, the thermo-hydraulic modeling requires sophisticated numerical processing using microprocessor systems that allow the algorithm to converge with times compatible with protection of the nuclear reactor.

SUMMARY

In this context, the present disclosure aims to propose a method for operating a nuclear reactor that does not have the above defects.

To this end, the present disclosure relates to a method for operating a nuclear reactor comprising a core, the method containing the following steps:
 acquisition of a plurality of quantities characterizing the operation of the nuclear reactor;
 calculation of at least one Departure from Nuclear Boiling using a deep neural network, the entries of the deep neural network being determined using the acquired quantities, the deep neural network comprising at least two hidden layers of at least five neurons each;
 calculation of the deviations between the at least one calculated Departure from Nuclear Boiling from a plurality of predetermined reference threshold values;
 generation of a control signal for a reactor control system, using the calculated deviations, the control signal being selected from a list containing at least the following values:
 automatic reactor shutdown or alarm;
 do nothing;
 emergency shutdown of the nuclear reactor by the control system when the elaborated control signal has the value "automatic reactor shutdown", or emission of an alarm signal by the control system when the elaborated control signal has the value "alarm".

The low DBNR algorithm has the major defect that the local thermo-hydraulic quantities are reconstructed with a simplified physical model: single channel, single phase model, without thermo-hydraulic correlation other than the critical flux correlation (pressure drop, void rate, . . . ).

The use of a deep neural network enables determination of the critical heat flux ratio as a function of the current values of the limiting quantities characterizing the operation of the nuclear reactor, much more precisely and much faster than with the low DBNR algorithm implemented today.

The values predicted by the deep neural network are much closer to the values calculated by the reference thermo-hydraulic code. The reconstruction error of the DBNR is greatly reduced. As a consequence, the operating margins of the nuclear reactor are much better.

The operating method may also have one or more of the following characteristics, considered individually or in any technically possible combination:
- the said acquired quantities include neutron flux measurements made by neutron flux detectors, the neural network entries containing the axial power distribution in the core of the nuclear reactor, reconstructed from the acquired neutron flux measurements;
- the axial power distribution is a vector having a plurality of components, each component corresponding to a mean power of the nuclear reactor per axial slice at a given axial position, each component defining one of the entries of the deep neural network;
- neutron flux detectors are ex-core detectors arranged outside the core;
- neutron flux detectors are in-core detectors permanently inserted in the core;
- the nuclear reactor comprises a pressure vessel containing the core and at least one primary loop, the primary loop comprising hot and cold branches fluidly connected directly to the vessel, a pressurizer controlling a pressure in the primary loop, and a primary pump ensuring the circulation of primary fluid in the primary loop, the acquired quantities comprising, for the or each primary loop, one or more of the following quantities: pressurizer pressure, primary fluid flow rate in the primary loop, temperature of the primary fluid in the hot and cold branches;
- the neural network entries include one or more of the following quantities: pressure of the pressurizer, primary fluid flow rate in the primary loop, temperature of the primary fluid in the cold branch;
- the neural network entries include the thermal power released by the core;
- the thermal power released is determined by calculation, using at least the pressurizer pressure, the primary fluid flow rate, the temperatures of the primary fluid in the hot and cold branches, acquired for at least one primary loop;
- the thermal power released is determined by calculation, using the acquired neutron flux measurements;
- the entries of the neural network include the enthalpy rise factor;
- the acquired quantities include a current insertion position of the core reactivity control devices, the enthalpy rise factor being determined by implementing the following operations:
  - calculation of a radial power peak factor using the acquired current insertion position;
  - calculation of the enthalpy rise factor using the calculated radial power peak factor, the reconstructed axial power distribution and the determined thermal power output;
- the enthalpy rise factor is reconstructed using the axial power distribution;
- the nuclear reactor comprises multiple primary loops, a Departure from Nuclear Boiling being calculated for each primary loop using the deep neural network using at least said quantities acquired for said primary loop;
- the detectors are distributed in several sets, the detectors of a same set being staggered vertically above each other, a minimum Departure from Nuclear Boiling being calculated for each set of in-core neutron flux detectors using the deep neural network with the entries determined using at least the neutron flux measurements made by the in-core neutron flux detectors (31) of said set;
- in the deviation calculation step, a set of deviations is calculated between each calculated Departure from Nuclear Boiling and the plurality of predetermined reference values;
- in the step of generating a control signal, generating a provisional control signal for each calculated Departure from Nuclear Boiling using the corresponding set of deviations, the provisional control signal being selected from the list comprising at least the following values: automatic reactor shutdown or alarm;
  do nothing;
- the control signal being elaborated by using at least several of the provisional control signals;
- the critical heat flux ratio is calculated by the deep neural network using the following formula:

$$Y(X_0) = [\Pi_{i=1}^{i=nH+1} \sigma_i \cdot A_i] \cdot X_0$$

where Y is the calculated Departure from Nuclear Boiling
  $X_0$ is the entries vector;
  nH is the number of hidden layers of the deep neural network; $A_i$ is a predetermined matrix of dimensions $N_i * N_{i-1}$, $N_i$, where Ni is the number of neurons in layer i and Ni−1 is the number of neurons of the layer i−1;
  $\sigma_i$ is a predetermined nonlinear operator;
  $A_i$ is a matrix acting as an affine transformation on the components of the vector $X_{i-1}$, the vector $X_{i-1}$ being the vector whose components are determined by the layer of neurons i−1;
  $\sigma_i$ acts as a sigmoid function on all the components of the vector $A_i \cdot X_{i-1}$, the vector $X_{i-1}$ being the vector whose components are determined by the neuron layer i−1;
- the method comprises a deep neural network design step, the design step comprising the following sub-steps:
  constitution of a database comprising at least 100,000 reactor core states, each state being defined by a set of values of said magnitudes characterizing the operation of the nuclear reactor and by a minimum Departure from Nuclear Boiling value calculated by a reference 3D thermal-hydraulic calculation code using the set of values, said states being chosen to cover a plurality of predetermined accident situations of category 2, the reactor control system being provided to handle said accident situations;
  learning of the deep neural network, using at least part of the database;
  validation of the deep neural network by using a part of the database independent of that used for the learning phase, and testing of the neural network obtained by coupling with accidental neutronic and thermal-hydraulic codes, making it possible to simulate accidental transients requiring the intervention of the control system.

According to a second aspect, the present disclosure relates to a nuclear reactor comprising:
a core;
a control system;
an information processing unit, configured to implement the operating method having the above characteristics.

BRIEF SUMMARY OF THE DRAWINGS

Other features and advantages will emerge from the detailed description, given below as an indication and in no way limiting, with reference to the appended figures, among which are the following.

DETAILED DESCRIPTION

Figure 1:
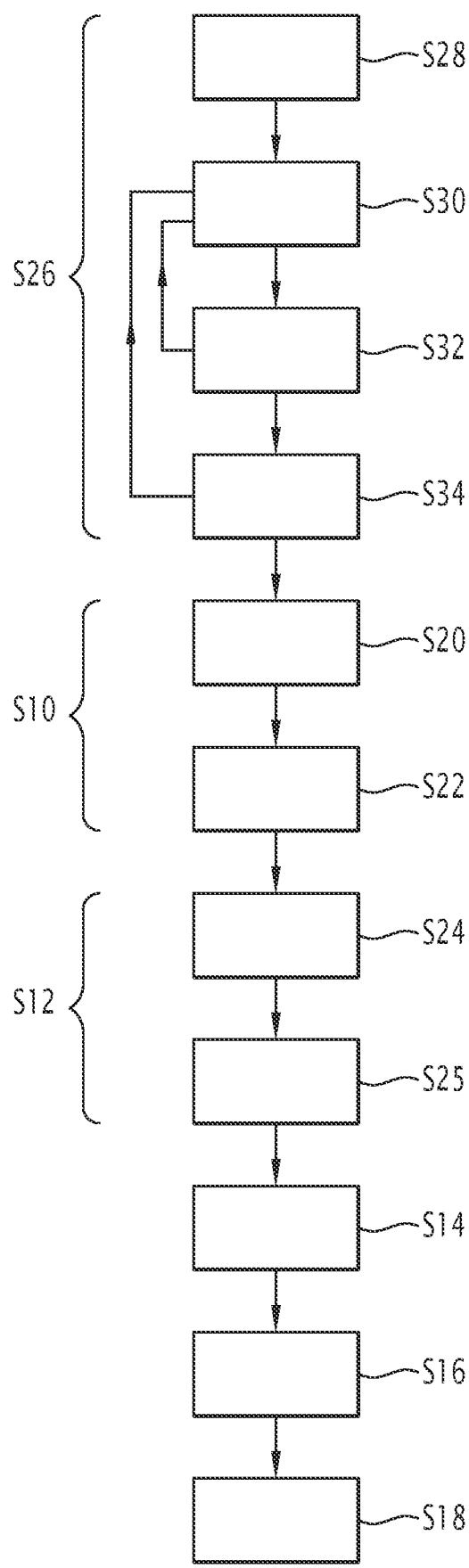
FIG. 1 is a step diagram showing the method of the present disclosure.
Figure 2:
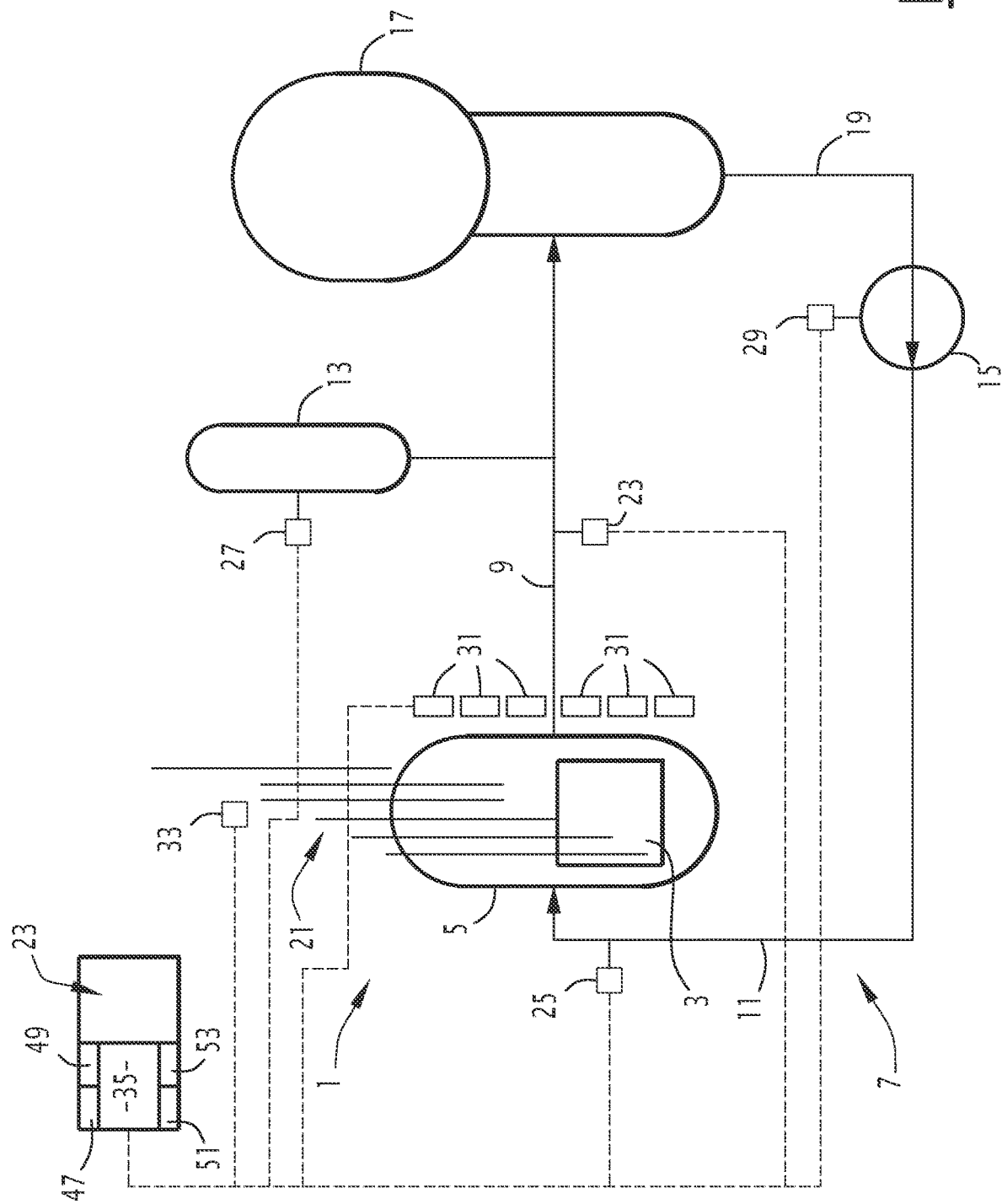
FIG. 2 is a simplified schematic representation of a nuclear reactor intended for the implementation of the method in FIG. 1.

The operating method shown schematically in FIG. 1 is intended to be implemented in a nuclear reactor of the type shown in FIG. 2.

This nuclear reactor is typically a Pressurized Water Reactor (PWR).

Alternatively, it is intended to be used in any other suitable nuclear reactor.

The nuclear reactor 1 has a core 3.

The core 3 typically consists of a plurality of prismatic nuclear fuel assemblies arranged one against the other. Each nuclear fuel assembly comprises a plurality of nuclear fuel rods, held in position relative to each other by grids.

Each rod has a tubular cladding made of a metal such as zircaloy, with nuclear fuel pellets stacked inside the cladding.

The nuclear reactor 1 also includes a pressure vessel 5 containing a core 3 and at least one primary loop 7.

Typically, the nuclear reactor has several primary loops 7, for example three or four primary loops 7.

The or each primary loop 7 includes hot and cold branches 9, 11 connected fluidically directly to the vessel 5, a pressurizer 13 controlling the pressure in the primary loop 7, and a primary pump 15 providing circulation of primary fluid in the primary loop 7. The pressurizer 13 is generally common to the different primary loops.

Typically, the primary loop 7 also has a steam generator 17, located upstream of the primary pump 15.

The hot branch 9 fluidly connects a primary fluid outlet manifold from the vessel 5 to the primary fluid inlet water box of the steam generator 17. The pressurizer 13 is connected to hot branch 9.

An intermediate branch 19 of the primary circuit, often referred to as the "U branch", connects the primary fluid outlet water box of the steam generator 17 to the suction of the primary pump 15. The cold branch 11 connects an outlet of the primary pump 15 to a primary fluid inlet of the tank 5.

The nuclear reactor 1 also has core reactivity control devices 21.

These control devices 21 are typically designated by the name of "control clusters" and include a plurality of rods made of a neutron-absorbing material.

The nuclear reactor 1 also includes mechanisms, not shown, configured to selectively move the control members 21 inside the vessel 5, so as to insert or extract them from core 3.

The nuclear reactor 1 also has a control system 23.

This control system 23 is typically a protection system, configured to cause an emergency shutdown of the nuclear reactor in the event of an accident situation.

To do this, the control system 23 is configured to send an automatic reactor shutdown command to the drive mechanism of the control bodies 21. Such an order causes the rapid insertion of the control bodies into the core 3 of the nuclear reactor.

Alternatively, the control system 23 is a monitoring system, configured to generate an alarm when the nuclear reactor approaches its operational limits.

According to another variant, the control system 23 acts as both a monitoring system and a protection system.

The nuclear reactor 1 is also equipped with a plurality of sensors, configured to measure a plurality of quantities characterizing the operation of the nuclear reactor 1.

Thus, the nuclear reactor 1 has temperature sensors 23, 25 measuring the temperature of the primary fluid in the hot and cold branches 9, 11 respectively.

The nuclear reactor 1 includes a sensor 27, measuring the pressure in the pressurizer 13.

The nuclear reactor also has a sensor 29 measuring the rotation speed of the primary pump 15.

The nuclear reactor 1 also has neutron flux detectors 31.

According to a first embodiment of the present disclosure, these detectors are ex-core detectors arranged outside the core 3.

The detectors 31 are distributed around the vessel 5.

Typically, they are multi-stage ex-core chambers, with 6 sections, for example, arranged one above the other along the central axis of the vessel.

The detectors 31 are used to measure the neutron flux emitted by the core 3 at different axial levels.

The nuclear reactor 1 includes a sensor 33 of the position of the core reactivity control devices 21.

The nuclear reactor also includes an information processing unit 35, configured to implement an operating method that will be described below.

The information processing unit is, for example, an element of the control system 23. It typically consists of a processor and a memory related to the processor. Alternatively, the data processing unit is made in the form of programmable logic components, such as FPGAs (Field-Programmable Gate Array), or in the form of dedicated integrated circuits, such as ASICs (Application-Specific Integrated Circuits).

The various sensors 23, 25, 27, 29, 31, 33 provide information to the data processing unit 35.

The method for operating the nuclear reactor 1 according to the first embodiment will now be described, with reference to FIGS. 1, 3 and 4.

Figure 4:
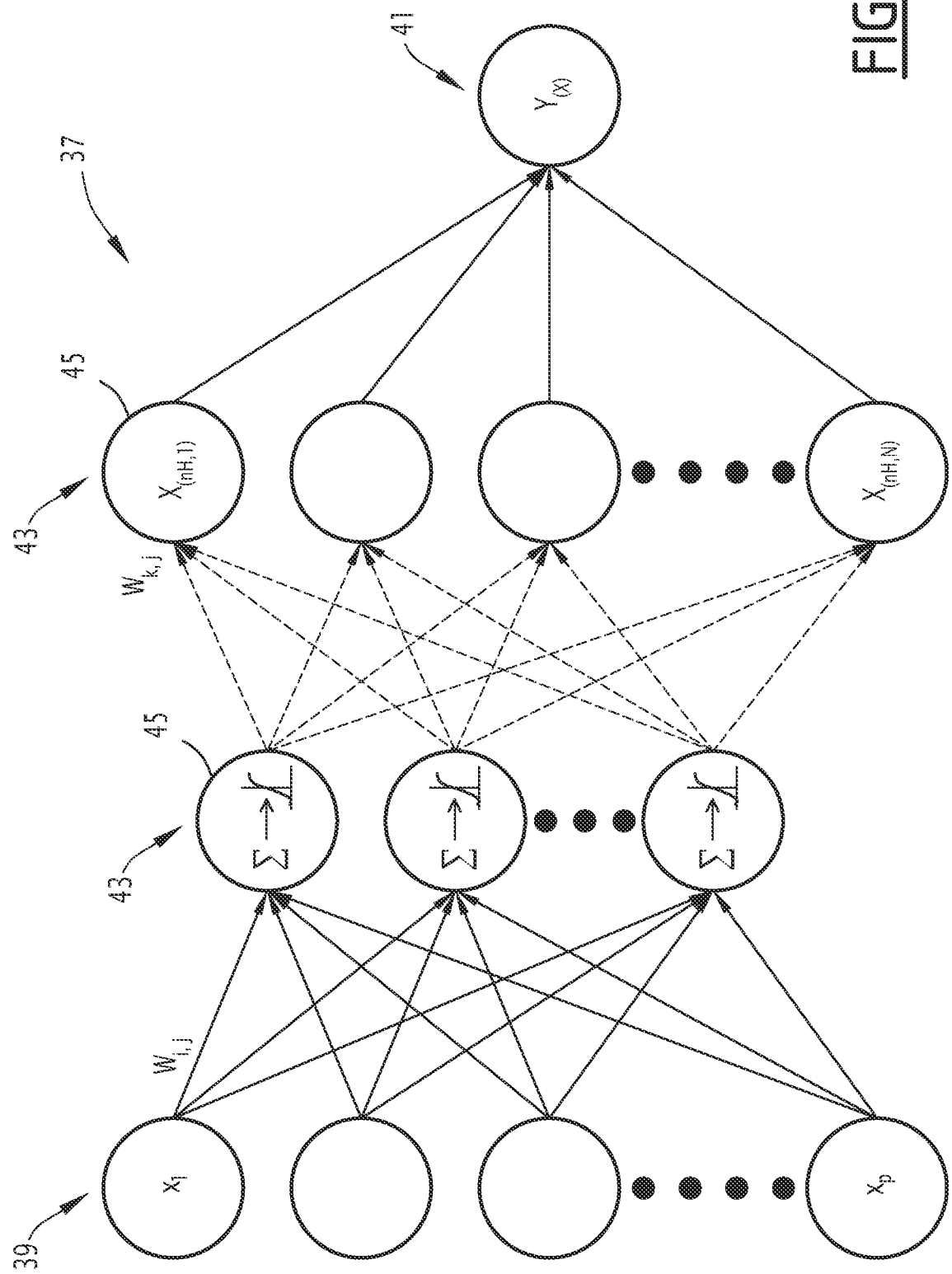
FIG. 4 is a schematic representation of the deep neural network used in the method in FIG. 1.

The method consists of the following steps:

step S10: acquisition of a plurality of quantities characterizing the operation of the nuclear reactor 1;

step S12: calculation of at least one critical heat flux ratio (CHFR) using a deep neural network 37, shown in FIG. 4, the entries of the deep neural network 37 being determined using the acquired quantities, the deep neural network 37 comprising at least two hidden layers of at least five neurons each;

step S14: calculation of the deviations between the at least one calculated Departure from Nuclear Boiling (CHFR) and a plurality of predetermined reference values;

step S16: formulation of a control signal for the control system of the reactor 23, using the calculated deviations, the control signal being chosen from the list comprising at least the following values:

automatic reactor shutdown or alarm;

do nothing;

step S18: emergency shutdown of the reactor by the control system 23, when the elaborated control signal has the value "automatic reactor shutdown", or emission of an alarm signal by the control system 23 when the elaborated control signal has the value "alarm".

The acquired quantities include at least neutron flux measurements made by the neutron flux detectors 31, allowing reconstruction of the axial power distribution P(z) in core 3, as described below.

The acquired quantities also include, for the single or each primary loop 7, one or more of the following quantities: pressure p of the pressurizer, primary fluid flow Q in the primary loop, primary fluid temperature in the hot and cold branches Tbc and Tbf.

Typically, all of the above quantities are acquired.

The pressurizer pressure p and primary fluid temperatures in the hot and cold branches Tbc and Tbf are supplied directly from sensors 27, 23, 25.

The primary fluid flow rate Q is reconstructed using the speed of rotation of the primary pumps, measured by the sensor 29. It is determined by calculation, using for example a relation directly indicating the primary fluid flow rate from the rotation speed.

The acquired quantities also include the current insertion position of the core reactivity control bodies 21, provided by the sensor 33

Figure 3:
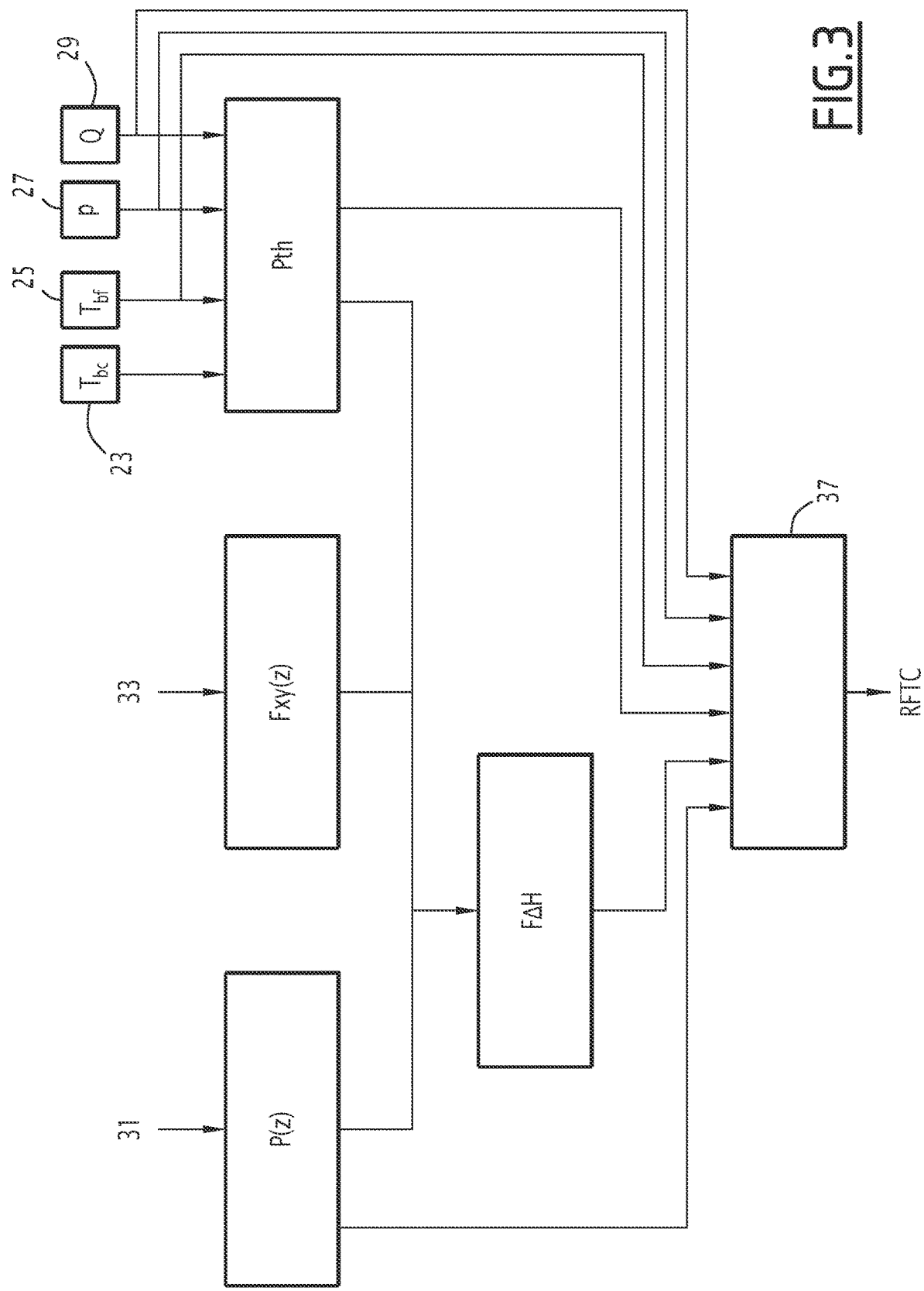
FIG. 3 is a schematic representation of the steps of acquisition and calculation of the method in FIG. 1, for a first embodiment of the present disclosure.

Thus, as illustrated in FIGS. 1 and 3, the S10 acquisition step typically includes a sub-step S20 reading of the value provided by the sensors 23, 25, 27, 29, 31, 33, with certain quantities characterizing the operation of the reactor being read directly from these sensors. These are in particular the pressure p of the pressurizer, and the hot and cold branch temperatures Tbc and Tbf.

The acquisition step S10 also includes a sub-step S22, during which at least one other quantity characterizing the operation of the nuclear reactor is determined by calculation from the measured values. This typically relates to the reconstruction of the primary fluid flow Q, or the application of filters on the quantities acquired in step S20.

The step of calculation of at least one DBNR S12 comprises a sub-step S24 of determination of the entries of the deep neural network 37 using the acquired quantities, and a sub-step S25 of calculation of the at least one DBNR using the deep neural network 37 by using the entries determined in sub-step S24.

The entries of the neural network 37 include at least the axial power distribution P(z) in the core 3 of the nuclear reactor, reconstructed from the acquired neutron flux measurements.

The axial power distribution P(z) is a vector having a plurality of components, each component corresponding to a mean power level of the nuclear reactor at a given axial position. Each component defines one of the entries of the deep neural network.

The number of components depends on the degree of accuracy desired for the reconstruction of the power distribution, and thus on the desired accuracy of the DBNR calculation. For example, the axial power distribution has as many components as there are sections in each detector 31: the signals from the different detector sections define the deep neural network entries.

Alternatively, the axial power distribution has more components than the number of sections in each detector 31. A module for reconstructing the axial power distribution from the values coming from the different sections of the detectors provides from a dedicated algorithmic processing (such as a polynomial interpolation) the more finely meshed axial power distribution, each component of which defines one of the deep neural network entries.

In sub-step S24, the power of the nuclear reactor 1 at a given axial level is thus calculated from the measured neutron fluxes, using for example analytical relationships directly giving the power level as a function of the neutron flux and the thermal power released by the Pth core, reconstructed as described below.

The entries of the neural network 37 also include the thermal power released by the Pth core.

In sub-step S24, the heat power output Pth is determined by calculation, using at least the pressurizer pressure p, the primary fluid flow rate Q, and the primary fluid temperatures in the hot and cold branches Tbc and Tbf.

The calculation method is known and will not be detailed here.

Typically, a calculation of the thermal power Pth released for each primary loop 7 is performed, using the quantities acquired for said primary loop 7.

Entries to the neural network 37 also include the enthalpy elevation factor FΔH.

In sub-step S24, the enthalpy rise factor FΔH is determined by implementing the following operations:
  calculation of a radial power peak factor Fxy(z), using the current insertion position of the acquired core 21 reactivity control bodies;
  calculation of the enthalpy rise factor FΔH using the calculated radial power peak factor Fxy(z), the reconstructed axial power distribution P(z) and the determined thermal power release Pth.

The radial power peak factor Fxy(z) and the enthalpy rise factor FΔH are calculated using known formulas, which will not be detailed here.

Preferably, an enthalpy rise factor calculation FΔH is performed for each primary loop 7, using the released thermal power Pth calculated for said primary loop 7.

When the nuclear reactor 1 comprises multiple primary loops 7, a Departure from Nuclear Boiling DBNR is preferably calculated in sub-step S25 for each primary loop 7, using the deep neural network 37. For this purpose, the deep neural network 37 uses the entries determined with at least the acquired quantities for the corresponding primary loop 7.

Alternatively, a single DBNR Departure from Nuclear Boiling is calculated using the deep neural network 37. It is calculated, for example, using entries determined by any processing of the acquired quantities for the primary loops, adapted for the DBNR evaluation.

As can be seen in FIG. 4, the deep neural network 37 comprises an input layer 39 located on the left of FIG. 4, an output layer 41 located on the right of FIG. 4, and a plurality of intermediate layers 43, also called hidden layers. The number nH of intermediate layers 43 is greater than or equal to two, preferably greater than or equal to five, and preferably greater than or equal to ten.

This makes it possible to account for a large number of different situations in the nuclear reactor.

Each hidden layer 43 comprises at least five neurons 45, preferably at least seven neurons 45, and preferably at least ten neurons 45.

The input layer 39 has as many input neurons as there are entries.

For example, input layer 39 has one input neuron for each of the entries p, Q, Tbf, Pth, FΔH. It also has one input neuron for each of the components of the axial power distribution P(z).

For example, input layer 39 has eleven input neurons, if the axial power distribution P(z) is a six-component vector.

The output layer 41 has a single output neuron, corresponding to the minimum value of the PCR calculated for the corresponding primary loop.

Advantageously, the entries are subjected to a first post-processing before being introduced into the neural network 37 in step S22 of FIG. 1.

The first post-processing consists, for example, in applying dynamic compensation terms, typically advance-delay filters, allowing each acquired quantity to be the image of the corresponding physical parameter. This post-processing compensates for the instrumentation response time (cold and hot branch temperature measurements of the vessel), the dropping time of the core reactivity control devices, and the response time of the processes and processing algorithms. The functional nature of information processing by the neural network 37 allows the need to use filters to be considerably reduced, compared with conventional algorithms.

The entries are preferably the subject of a second post-processing before being introduced into the neural network, by normalization of each of the quantities or components.

The entries constitute a vector, called an input vector and noted X0. Each hidden layer i of the neural network elaborates a vector of values Xi, by processing the vector of values $X_{i-1}$ from the immediately preceding layer i-1.

Thus, for each hidden layer i, i being between 1 and nH, $$X_i = \sigma_i \cdot A_i \cdot X_{i-1}$$

where $A_i$ is a predetermined matrix of dimensions $N_i * N_{i-1}$, $N_i$, where Ni is the number of neurons in layer i and Ni-1 is the number of neurons in layer i-1;

σi is a predetermined non-linear operator.

In other words, the Departure from Nuclear Boiling is calculated by the deep neural network 37 using the following formula:

$$Y(X_0) = [\Pi_{i=1}^{i=nH+1} \sigma_i \cdot A_i] \cdot X_0$$

where Y is the calculated Departure from Nuclear Boiling.

Each matrix $A_i$ acts as an affine transformation on the components of the vector Xi-1. In other words:

$$A_i X_{i-1} = W_i X_{i-1} + b_i$$

where $W_i$ is the matrix of synaptic weights that link the Ni neurons of layer i to the $N_{i-1}$ neurons of layer i-1, and bi is the vector of the Ni dimensional biases of layer i.

For the last layer we note that the matrix $A_{nH+1}$ is of dimension $1 \times N_{nH}$ and that $\sigma_{nH+1} = 1$: there is no application of a non-linear transfer function to establish the Y signal of the last layer.

The non-linear operators σi each act as a non-linear function, for example sigmoid, on all the components of the AiXi-1 vector. A sigmoid function is a function expressed as follows:

$$f(x) = \frac{1}{1 + e^{-lx}}$$

where l is a specially parameterized constant.

In step S14, for each primary loop, a set of deviations is calculated between the critical heat flux ratio calculated for said primary loop and the plurality of predetermined reference values.

Thus, as many deviation calculations are performed as there are primary loops.

These values are operating reference thresholds, called protection (or monitoring) thresholds, which incorporate the uncertainties of the method, that is, the measurement uncertainties and the calculation uncertainties.

Typically, the calculated deviations are displayed alpha-numerically or graphically on at least one screen for real-time monitoring of the protection and operating margins of the unit for each primary loop.

When a single DBNR is calculated, a single set of deviations is calculated in step S14.

Step S16 is used to interpret the sets of deviations found in step S14.

To do this, a provisional control signal is elaborated for each primary loop, using the set of deviations calculated for that loop.

When the control system is a protection system, the provisional control signal is chosen from the list containing at least the following values: automatic reactor shutdown, do nothing.

When the control system is a monitoring system, the provisional control signal is chosen from the list containing at least the following values: alarm, do nothing.

When the control system is a protection and monitoring system, the temporary control signal is chosen from the list containing at least the following values: automatic reactor shutdown, alarm, do nothing.

The control signal sent to the control system of reactor 23 is elaborated using the provisional control signals of all primary loops.

After having interpreted the deviations noted in step S14, step S16 consists of applying voting logics for the signals elaborated for each loop of the reactor. For example, if the majority of the provisional control signals have the value "automatic reactor shutdown", then the control signal sent to control system 23 is "automatic reactor shutdown".

In step S18, the control system 23 receives the control signal developed in step 16, and acts accordingly. For example, it triggers an automatic shutdown of the reactor 1 by insertion of the reactivity control devices of the core 21 if the control signal is "automatic reactor shutdown", or the emission of an alarm signal if the control signal elaborated has the value "alarm".

Preferably, the method also includes a step S26 for the design of the deep neural network 37. The design step S26 consists of the following sub-steps:

S28: creation of a database containing at least 100,000 reactor states,

S30: learning of the deep neural network, using at least part of the database.

Advantageously, the database includes at least 500,000 reactor states, preferably at least 1,000,000 reactor states.

Each state is defined by a set of values of the quantities characterizing the operation of the nuclear reactor, and by a Departure from Nuclear Boiling value. The said Departure from Nuclear Boiling value is calculated by a 3D thermo-hydraulic reference code using the corresponding set of values of the quantities characterizing the operation of the nuclear reactor.

The 3D core thermal-hydraulic calculation code is a high-precision code, for example the FLICA code. Typically, Monte-Carlo sampling techniques are used to generate the database.

The states are chosen to cover a plurality of predetermined accident situations leading to trigger the intervention of the reactor's generic low-level DBNR protection chain.

Predetermined accident situations are, for example, those referred to as Category 2 in the nuclear reactor safety report, which require the intervention of the generic low-level DBNR protection chain.

The ranges of variation of the quantities characterizing the operation of the nuclear reactor are also chosen in such a way that they cover the range of validity of the critical thermal flux correlation.

The data are generated in such a way that they optimize the detection of physical symmetry during the learning phase by the neural network.

Preferably, the input variables are normalized.

The learning sub-step S30 is performed on only a part of the database created in sub-step S28. For example, it uses between 50% and 90% of the database, typically 80%.

The learning phase consists of the following operations:

i) Determination of the optimal neuronal structure by carrying out a sensitivity study dedicated to the choice of model hyperparameters, this step may require the use of optimization algorithms (of the genetic algorithm type): number of hidden layers, number of neurons per layer, choice of the transfer function imposed by the phenomenology of the boiling crisis phenomenon (e.g. derivable and having to present a strong non-linear character due to the analytical expression of the critical flux correlation);

ii) Development of a learning algorithm optimized specifically for the generated database, allowing acceleration and stabilization of the convergence process, and to improve convergence towards more robust solutions by avoiding local minima. This improves the generalization capabilities of the neural network and thus its ability to respond positively to the validation and testing phases described below.

This is achieved, for example, by developing an adaptive batch stochastic gradient descent algorithm. Updating of the synaptic weight and bias tensor learning at each cycle is performed on data batches of evolving size by scanning the entire learning base, parameterized by the cycle number.

In addition, inertia methods on the adaptation step of the learning algorithm are advantageously used, in order to improve the efficiency and robustness of the learning phase.

Preferably, step S26 also includes a sub-step S32 of validation of the deep neural network determined in sub-step S30. This validation phase is performed on a second part of the database, which was not used in sub-step S30. Typically, the entire part of the database that was not used in step S30 is used in step S32. This enables validation of the deep neural network predictions developed at the end of step S30 by comparison with the predictions generated with the reference code, and to characterize the generalizability of the predictive model thus developed. Sensitivity studies are preferably carried out during sub-step S32. If the validation phase is unsatisfactory, we return to sub-step S30, then modify the neuronal structure (that is, the number of hidden layers, number of neurons per layer), or the hyperparameters of the learning algorithm, in order to restart the learning step aimed at determining the matrices of the synaptic weights and bias vectors of the neural network thus defining the previously defined Ai matrices.

Preferably, step S26 also includes a sub-step S34 of phenomenological validation (testing) of the deep neural network on database-independent data determined in sub-step S28.

During sub-step S34, the deep neural network is implemented in coupling with calculation codes simulating accidental transients. These accidental transients are typically those defined in the nuclear reactor safety report.

If this final test phase is not satisfactory, sub-step S30 is repeated.

Thus, the method described above is particularly adapted to be implemented by a reactor of the type described above.

Conversely, the nuclear reactor 1 described above is particularly adapted to implement the method just described.

In particular, as shown in FIG. 2, the information processing unit 35 comprises:

a module 47 for the acquisition of a plurality of quantities characterizing the operation of the nuclear reactor;

a module 49 for calculating at least one Departure from Nuclear Boiling using the deep neural network 37, configured to determine the entries of the deep neural network 37 using the quantities acquired and determined, the deep neural network 37 comprising at least two hidden layers of at least five neurons each;

a module 51 for calculating the deviations between the at least one calculated Departure from Nuclear Boiling and a plurality of predetermined reference values;

a module 53 for generating a control signal for the reactor control system using the calculated deviations, the control signal being selected from the list comprising at least the following values:

automatic reactor shutdown or alarm;

do nothing.

The reactor control system 23 is configured to cause an automatic shutdown of the reactor when the elaborated control signal has the "automatic reactor shutdown" value. The reactor control system 23 is configured to generate an alarm when the processed control signal has the value "alarm".

In other words, the module 47 is configured to implement step S10 of the method described above. The module 49 is configured to carry out step S12 of the method described above.

The module 51 is configured to perform step S14 of the method described above and the module 53 is configured to perform step S16 of the method described above.

Figure 5:
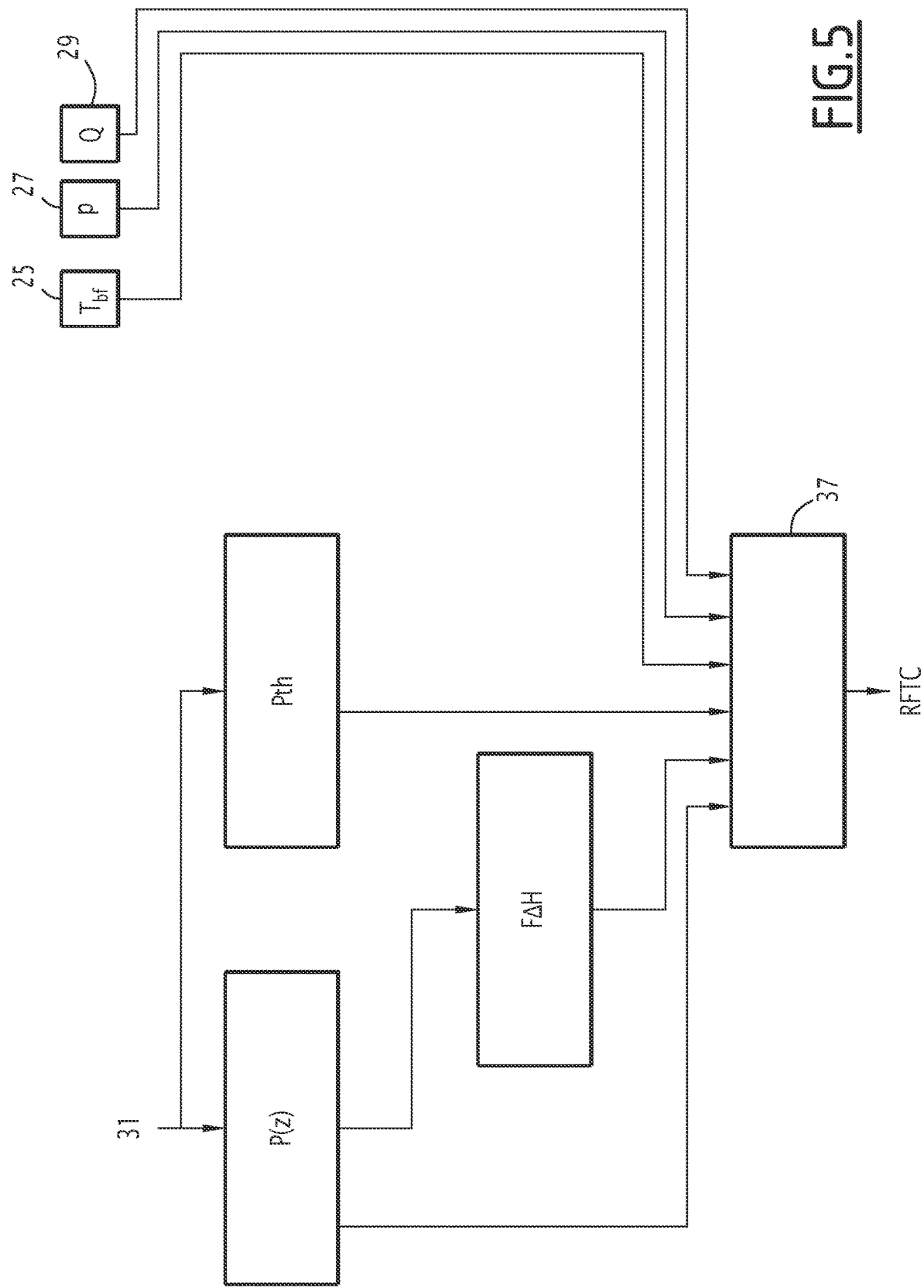
FIG. 5 is a schematic representation of the steps of acquisition and calculation of the method in FIG. 1, for a second embodiment of the present disclosure.

A second embodiment of the present disclosure will now be described, with reference to FIG. 5. Only the points by which the second embodiment differs from the first will be detailed below. Identical elements or elements performing the same functions will be designated by the same references.

In the second embodiment, the neutron flux detectors 31 are not ex-core detectors arranged outside the core 3. The neutron flux 31 detectors are in-core detectors, permanently inserted in the core 3.

They are distributed in several sets, the detectors of the same set being staggered vertically above each other.

The detectors are colons, for example, vertically arranged on rods in the core. Each electron rod allows the neutron flux to be measured at several axial heights in the core, such as six axial heights for a vertical arrangement of 6 electrons. The nuclear reactor is typically equipped with 12 rods of 6 electrons each, distributed in the core.

The thermal power Pth released is determined by calculation, using the acquired neutron flux measurements. This calculation no longer uses the pressurizer pressure p, the primary fluid flow rate Q, the temperatures of the primary fluid in the hot and cold branches Tbc, Tbf. The calculation formulas used are known and will not be detailed here.

The enthalpy rise factor $F\Delta H$ is reconstructed using the axial power distribution $P(z)$. It is not necessary to reconstruct the factor $Fxy(z)$ from the measurement provided by the sensor 33 of the position of the reactivity control bodies of the core 21.

In step S12, a Departure from Nuclear Boiling DBNR is calculated for each set of 31 in-core neutron flux detectors, using the deep neural network 37, with the entries determined using the neutron flux measurements made by said 31 in-core neutron flux detectors.

From the neutron flux measurements at several axial heights provided by the detector set, a set of parameters P(z), Pth and FΔH, specific for this detector set, is determined. These parameters are used as entries for the neural network 37.

Other entries are also used, such as pressurizer pressure p, primary fluid flow Q, primary fluid temperature in the cold branch Tbc, Tbf. These input quantities are the same for all sensor sets.

In the deviation calculation step S14, a set of deviations is calculated between each previously determined critical heat flux ratio and the plurality of predetermined reference values.

In the control signal generation step S16, a provisional control signal is generated for each calculated critical heat flux ratio using the corresponding set of deviations.

The control signal is elaborated using at least several of the provisional control signals according to the voting logic described above.

A third embodiment of the present disclosure will now be briefly described. Only the points by which the third embodiment differs from the second will be detailed below. Identical elements or elements performing the same functions will be designated by the same references.

In the third embodiment, the data processing unit 35 has a continuous 3-dimensional mapping of the power in the reactor core.

This mapping is one of the quantities characterizing the operation of the reactor. The other quantities, for example Tbf, p and Q, are acquired as in the first and second modes.

Some entries of the deep neural network 37 are determined by computation, using the 3D mapping of power distribution in the core, thus replacing the quantities P(z), Pth and FΔH previously described for the first embodiment of the present disclosure.

Advantageously, the components of the 3D power distribution constitute the entries of a dedicated neural structure, called convolution layer, which enables optimization of the extraction of characteristics of the power distribution in order to elaborate the deep neural network, and in particular to optimize its structure for a hardware implementation. The output of this convolution layer defines part of the entries of the deep neural network 37. In particular, this output replaces the vector of the components of the axial power distribution at the input of the deep neural network 37, as well as the size FΔH. This neural structure, adapted to process spatially structured data, replaces matrix multiplication by a mathematical convolution operation between the input power distribution of the structure and a series of kernels (or filters) whose degrees of freedom are adjusted during the training of step S30. The convolution layer also includes a non-linear processing of the convolution outputs through non-linear transfer functions, as well as a third step allowing to introduce invariants under local geometric transformations (such as translations). These steps can be repeated in the elaboration of the optimal neuronal structure.

The method for the exploitation of the present disclosure may present multiple variants.

The quantities characterizing the operation of the nuclear reactor, acquired in step S10, and the entries of the deep neural network may not correspond exactly to the list described above. Other quantities may be acquired. Some quantities may not be acquired. Some entries may not be used. Other entries may be added.

In any case, the power distribution has an important impact on the location in the core and the value of the minimum margin of the DBNR.

Taking this into account improves the accuracy of the DBNR reconstruction. The quantities characterizing the operation of the nuclear reactor are not necessarily acquired in the way described above and shown in FIGS. 2, 3 and 5. Some quantities may not be read directly by the sensors equipping the nuclear reactor. They could be derived from other measured quantities or values from the operating system of the nuclear reactor.

The convolution layer described in the third embodiment could also be implemented in the first two realization modes in order to process the axial power distribution P(z) in the neuronal structure. The other entries of the neural network being unchanged.

The method described above has multiple advantages.

The response time is extremely short, for example in the millisecond range. This is obtained in particular because the method does not require the implementation of convergence loops, only the parameters specific to the deep neural network being necessary, the unit calculation operations are simple and easily parallelizable if the hardware solution allows it.

Consequently, it frees up computing capacity for other parts of the nuclear reactor control and instrumentation system.

This performance is obtained by the fact that the complexity of the underlying physics is encoded by the parameterization of the deep neural network from the database. This allows the deep neural network to reconstruct the DBNR value of the thermo-hydraulic reference code, by simply using the synaptic weights and transfer functions of the neural structure.

The DBNR computation provided by the deep neural network is very reliable, and the response is close to the one provided by the 3D thermo-hydraulic reference code (here FLICA). The conservatism of the response is adjustable.

The quality of the response provided by the deep neural network is notably due to the fact that no reconstruction of intermediate local thermo-hydraulic variables is performed without fine physical modeling. The reliability of the response provided is a function of the fineness of the mesh of the database used for learning the neural network. This only costs computing time, before commissioning in the nuclear reactor. The method is also more robust to the propagation of uncertainties on the input data (initiated by random fluctuations in the measurements from the core instrumentation) which improves the validation and hardware qualification stage.

What is claimed is:

1. A method for operating a nuclear reactor comprising a core, the method comprising the following steps:
   acquiring a plurality of quantities characterizing the operation of the nuclear reactor;
   calculating at least one departure from nucleate boiling ratio using a deep neural network, entries of the deep neural network being determined using the acquired quantities, the deep neural network comprising at least two hidden layers of at least five neurons each;
   calculating deviations between the at least one calculated departure from nucleate boiling ratio and a plurality of predetermined reference threshold values;
   generating a control signal for a control system of the reactor, using the calculated deviations, the control signal being selected from a list comprising at least the following values:

automatic reactor shutdown and
alarm; and
either:
emergency shutting down the nuclear reactor by the control system based on the generated control signal having the value of automatic reactor shutdown,
or
emitting an alarm signal by the control system based on the generated control signal having the value of alarm;
wherein
the acquired quantities comprise neutron flux measurements made by neutron flux detectors, and
the entries of the neural network comprise an axial power distribution in the core of the nuclear reactor,
wherein the axial power distribution is reconstructed from the acquired neutron flux measurements.

2. The method according to claim 1, wherein the axial power distribution is a vector having a plurality of components, each component corresponding to an average power of the nuclear reactor per axial slice at a given axial position, each component defining one of the entries of the deep neural network.

3. The method according to claim 1, wherein the neutron flux detectors are ex-core detectors arranged outside the core.

4. The method according to claim 1, wherein the neutron flux detectors are in-core detectors permanently inserted in the core.

5. The method according to claim 4, wherein the entries of the neural network include the thermal power released by the core and wherein the thermal power released is determined by calculation, using the acquired neutron flux measurements.

6. The method according to claim 4, wherein the detectors are distributed in several sets, the detectors of a same set being vertically staggered one above the other, a minimum departure from nucleate boiling ratio being calculated for each set of in-core neutron flux detectors with the aid of the deep neural network with the entries determined using at least the neutron flux measurements made by the in-core neutron flux detectors of the set.

7. The method according to claim 6, wherein in the deviation calculation step, a set of deviations is calculated between each calculated departure from nucleate boiling ratio and the plurality of predetermined reference values; and
wherein in the step of generating the control signal, elaborating a provisional control signal for each calculated departure from nucleate boiling ratio using the corresponding set of deviations, the provisional control signal being selected from the list comprising at least the following values:
automatic reactor shutdown and alarm;
the control signal being elaborated using at least several of the provisional control signals.

8. The method according to claim 5, wherein in the deviation calculation step, a set of deviations is calculated between each calculated departure from nucleate boiling ratio and the plurality of predetermined reference values; and
wherein in the step of generating the control signal, elaborating a provisional control signal for each calculated departure from nucleate boiling ratio using the corresponding set of deviations, the provisional control signal being selected from the list comprising at least the following values:
automatic reactor shutdown and alarm;
the control signal being elaborated using at least several of the provisional control signals.

9. The method according to claim 1, wherein the nuclear reactor comprises a pressure vessel containing the core and at least one primary loop, the primary loop comprising hot and cold branches fluidly connected directly to the vessel, a pressurizer controlling a pressure in the primary loop, and a primary pump ensuring the circulation of primary fluid in the primary loop, the acquired quantities comprising, for the at least one primary loop, one or more of the following quantities: pressure of the pressurizer, flow rate of primary fluid in the primary loop, and temperature of the primary fluid in the hot and cold branches.

10. The method according to claim 9, wherein the neural network entries have one or more of the following variables: pressurizer pressure, flow rate of primary fluid in the primary loop and temperature of the primary fluid in the cold branch.

11. The method according to claim 9, wherein the entries of the neural network include a thermal power released by the core and wherein the thermal power released is determined by a calculation using, acquired for the at least one primary loop, at least the pressurizer pressure, the primary fluid flow rate and the temperatures of the primary fluid in the hot and cold branches.

12. The method according to claim 9, wherein the nuclear reactor comprises several primary loops, a departure from nucleate boiling ratio being calculated for each primary loop with the aid of the deep neural network using at least the acquired quantities for the primary loop.

13. The method according to claim 1, wherein the entries of the neural network include the thermal power released by the core.

14. The method according to claim 1, wherein the entries of the neural network include the enthalpy rise factor.

15. The method according to claim 14, wherein the neutron flux detectors are ex-core detectors arranged outside the core and the entries of the neural network include the thermal power released by the core,
wherein the thermal power released is determined by a calculation using, acquired for the at least one primary loop, at least the pressurizer pressure, the primary fluid flow rate and the temperatures of the primary fluid in the hot and cold branches,
wherein the acquired quantities include a current insertion position of core reactivity control bodies, the enthalpy rise factor being determined by carrying out the following operations:
calculating a radial power peak factor using the current acquired insertion position; and
calculating the enthalpy rise factor using the calculated radial power peak factor, the reconstructed axial power distribution and the determined thermal power output.

16. The method according to claim 14, wherein the neutron flux detectors are in-core detectors permanently inserted in the core and wherein the enthalpy rise factor is reconstructed using the axial power distribution.

17. The method according to claim 1, wherein the departure from nucleate boiling ratio is calculated by the deep neural network using the following formula:

$$Y(X_0) = [\Pi_{i=1}^{i=nH+1} \sigma_i \cdot A_i] \cdot X_0$$

where Y is the calculated departure from nucleate boiling ratio;
$X_0$ the being a vector having components, said components being said entries of the deep neural network determined using the acquired quantities;

nH is the number of hidden layers of the deep neural network;

A$_i$ is a predetermined matrix of dimensions $N_i * N_{i-1}$, where $N_i$ is the number of neurons in layer i and $N_{i-1}$ is the number of neurons in layer i−1;

σi is a predetermined non-linear operator.

18. The method according to claim 17, wherein each hidden layer i of the neural network elaborates a vector Xi, by processing the vector Xi−1 issued from the immediately preceding layer i−1, according to the following formula:

$$X_i = \sigma i \cdot Ai \cdot Xi-1$$

wherein each matrix Ai acts as an affine transformation on the vector Xi−1.

19. The method according to claim 17, wherein each hidden layer i of the neural network elaborates a vector Xi, by processing the vector Xi−1 from the immediately preceding layer i−1, according to the following formula:

$$Xi = \sigma i \cdot Ai \cdot Xi-1$$

wherein each non-linear operator σi acts as a sigmoid function on vector AiXi−1.

20. The method according to claim 1, wherein the method comprises a deep neural network design step, the design step containing the following sub-steps:

constituting a database containing at least 100,000 reactor core states, each state being defined by a set of values of the quantities characterizing the operation of the nuclear reactor and by a minimum departure from nucleate boiling ratio value calculated by a reference 3D thermo-hydraulic calculation code using the set of values, the states being chosen to cover a plurality of predetermined category 2 accident situations, the control system of the reactor being provided to handle the accident situations;

learning of the deep neural network, using at least part of the database;

validating the deep neural network using a part of the database independent of that used for the learning, and testing of the neural network obtained by coupling with accidental neutronic and thermal-hydraulic codes making it possible to simulate accidental transients requiring the intervention of the control system.

* * * * *